(12) United States Patent
Fu et al.

(10) Patent No.: US 11,054,606 B2
(45) Date of Patent: Jul. 6, 2021

(54) OPTICAL MODULE

(71) Applicant: APPOTRONICS CORPORATION LIMITED, Guangdong (CN)

(72) Inventors: Jinjiang Fu, Guangdong (CN); Fei Hu, Guangdong (CN); Lunchun Du, Guangdong (CN); Xinbo Wen, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/628,770

(22) PCT Filed: Jan. 31, 2018

(86) PCT No.: PCT/CN2018/074751
§ 371 (c)(1),
(2) Date: Mar. 16, 2020

(87) PCT Pub. No.: WO2019/007048
PCT Pub. Date: Jan. 10, 2019

(65) Prior Publication Data
US 2020/0200992 A1     Jun. 25, 2020

(30) Foreign Application Priority Data
Jul. 5, 2017   (CN) .......................... 201720808094.4

(51) Int. Cl.
*G02B 7/02*      (2021.01)
*G03B 21/20*     (2006.01)

(52) U.S. Cl.
CPC ............. *G02B 7/023* (2013.01); *G03B 21/20* (2013.01)

(58) Field of Classification Search
CPC ................................ G02B 7/023; G02B 21/20
(Continued)

(56) References Cited

U.S. PATENT DOCUMENTS 3,546,445 A * 12/1970 Marchant ............. B60Q 1/0683
                                                       362/396
2,594,569 A    7/1971 Cranmore
(Continued)

FOREIGN PATENT DOCUMENTS

CN    201926802    8/2011
CN    204462501    7/2015
(Continued)

OTHER PUBLICATIONS

International Search Report for International Application PCT/CN2018/074751, dated May 2, 2018.
(Continued)

*Primary Examiner* — Bryon T Gyllstrom
(74) *Attorney, Agent, or Firm* — Burris Law, PLLC (57) ABSTRACT

An optical module a first adjusting screw rod, a first anti-loosening assembly, a second adjusting screw and a second anti-loosening assembly. The first adjusting screw rod is configured to adjust a position of a component in a first direction a, and the second adjusting screw is configured to adjust a position of a component in a second direction b. The first anti-loosening assembly is configured to lock the first adjusting screw rod after position adjustment of the first adjusting screw rod, and the second anti-loosening assembly is configured to lock the second adjusting screw after position adjustment of the second adjusting screw.

16 Claims, 4 Drawing Sheets

(58) Field of Classification Search
USPC .......................................................... 362/418
See application file for complete search history.

(56) References Cited

U.S. PATENT DOCUMENTS

| | | | | |
|---|---|---|---|---|
| 3,594,569 | A * | 7/1971 | Cranmore | B60Q 1/0683 362/419 |
| 3,710,097 | A * | 1/1973 | Bright | B60Q 1/0683 362/549 |
| 3,823,314 | A * | 7/1974 | Germany | B60Q 1/0683 362/419 |
| 3,932,837 | A * | 1/1976 | Baker | B60Q 1/0683 362/419 |
| 4,188,655 | A * | 2/1980 | Tallon | B60Q 1/0683 362/275 |
| 4,903,173 | A * | 2/1990 | Mochizuki | F21S 41/60 362/544 |
| 5,003,436 | A * | 3/1991 | Yamada | B60Q 1/0683 362/420 |
| 5,063,480 | A * | 11/1991 | McMahan | B60Q 1/0686 362/462 |
| 5,897,199 | A * | 4/1999 | Norris | F21V 21/145 362/191 |
| 5,908,239 | A * | 6/1999 | Sugimoto | B60Q 1/0683 362/421 |
| 6,234,655 | B1 * | 5/2001 | Suehiro | B60Q 1/076 362/515 |
| 8,517,578 | B2 * | 8/2013 | Shiao | B60Q 1/076 362/467 |
| 2009/0262315 | A1 | 10/2009 | Tseng et al. | |
| 2011/0102747 | A1 | 5/2011 | Lee et al. | |

FOREIGN PATENT DOCUMENTS

| | | |
|---|---|---|
| CN | 205608269 | 9/2016 |
| CN | 105988182 | 10/2016 |
| CN | 106547067 | 3/2017 |
| CN | 206178326 | 5/2017 |
| DE | 202015007130 | 1/2016 |

OTHER PUBLICATIONS

Extended European Search Report for European application No. 18828936.7, dated Feb. 2, 2021.

* cited by examiner

OPTICAL MODULE

TECHNICAL FIELD

The present disclosure relates to optical devices, and in particular, to an optical module.

BACKGROUND

The statements in this section merely provide background information related to the present disclosure and may not constitute prior art.

At present, in a projector, a light source needs to be accurately aligned with a light-pipe of a light homogenization device of a light machine and be kept stable for a long time to ensure that the projector can work normally under long-term use conditions, and efficiency of the light machine will not decrease.

SUMMARY

The alignment of a light spot emitted by the light source with the light-pipe of the light homogenization device of the light machine is achieved by adjusting a position of a light-output lens of the light source such that the light spot emitted by the light source completely enters a light incident end of the light-pipe of the light machine. Under long-term use conditions, such as high and low temperature and impact vibration, it is desired that the light-output lens adjustment mechanism shall be extremely stable, so as to provide stable efficiency of the light source and the light machine. Therefore, it is desired to provide a two-dimensional light-output lens adjustment mechanism with high stability.

The present disclosure provides an optical module with improved stability of position adjustment and efficiency of a light source.

The optical module includes a first adjusting screw rod, a first anti-loosening assembly, a second adjusting screw and a second anti-loosening assembly. The first adjusting screw rod is configured to adjust a position of a component in a first direction, and the second adjusting screw is configured to adjust a position of a component in a second direction. The first anti-loosening assembly is configured to lock the first adjusting screw rod after position adjustment of the first adjusting screw rod, and the second anti-loosening assembly is configured to lock the second adjusting screw after position adjustment of the second adjusting screw.

The present disclosure provides an optical module, including: a first adjusting screw rod, a first anti-loosening assembly, a second adjusting screw and a second anti-loosening assembly. The first adjusting screw rod is configured to adjust a position of a component in a first direction, and the second adjusting screw is configured to adjust a position of a component in a second direction. The first anti-loosening assembly is configured to lock the first adjusting screw rod after position adjustment of the first adjusting screw rod, and the second anti-loosening assembly is configured to lock the second adjusting screw after position adjustment of the second adjusting screw, thereby providing beneficial effects of improving the stability of the position adjustment and ensuring the efficiency of the light source.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

In order that the disclosure may be well understood, there will now be described various forms thereof, given by way of example, reference being made to the accompanying drawings, in which.

DESCRIPTION

The following description is merely exemplary in nature and is not intended to limit the present disclosure, application, or uses. It should be understood that throughout the drawings, corresponding reference numerals indicate like or corresponding parts and features. The present disclosure will be described details in the following with reference to the accompanying drawings and forms.

Figure 1:
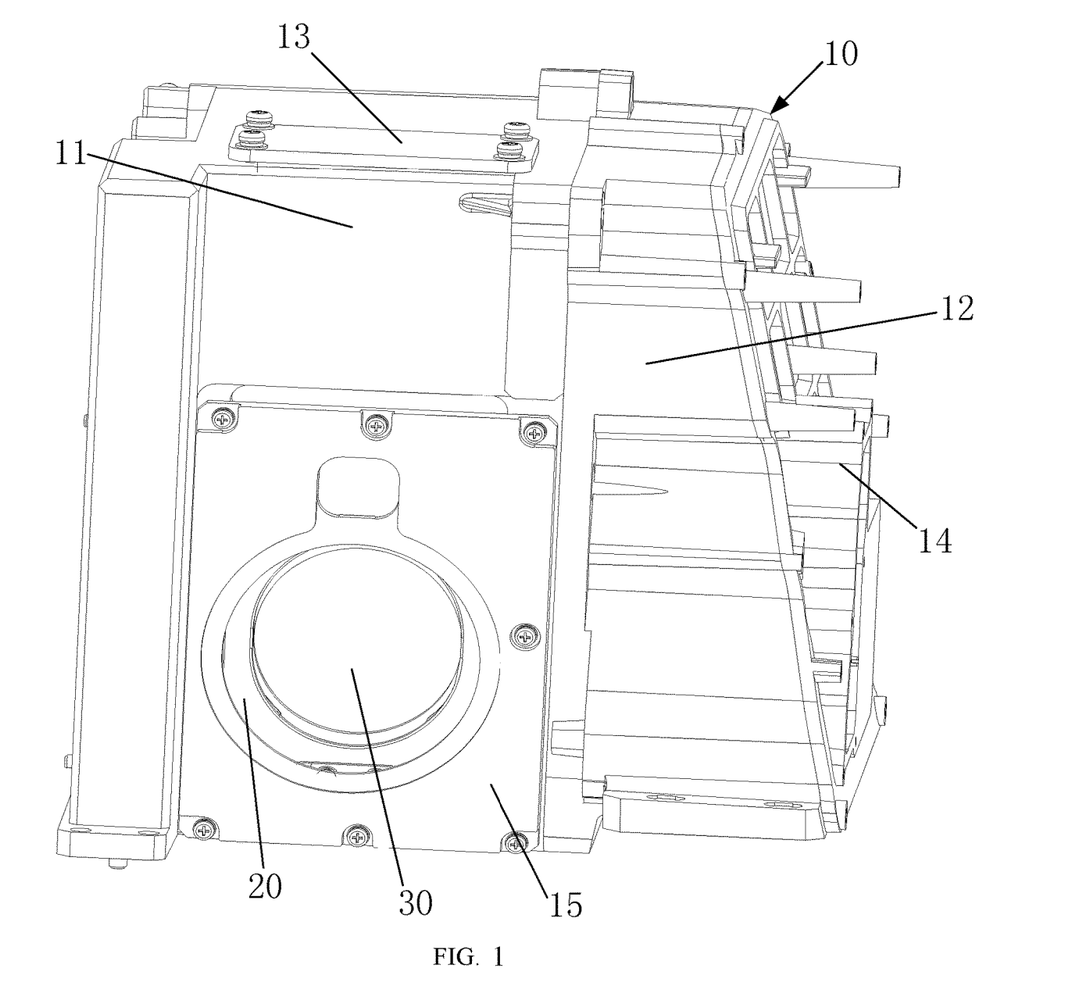
FIG. 1 is a schematic structural perspective view of an optical module according to a form of the present disclosure.
Figure 2:
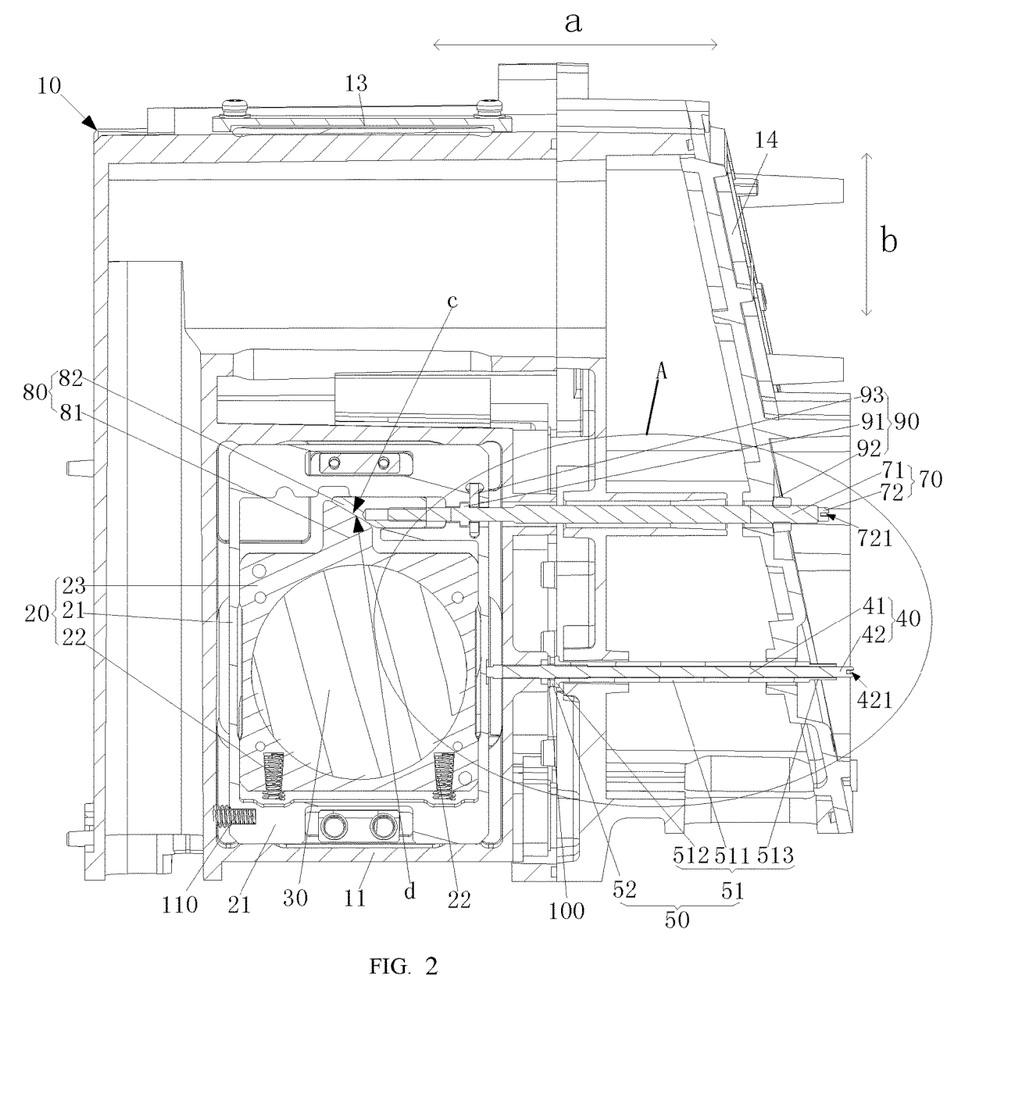
FIG. 2 is a schematic structural cross-sectional view of an optical module according to a form of the present disclosure.
Figure 3:
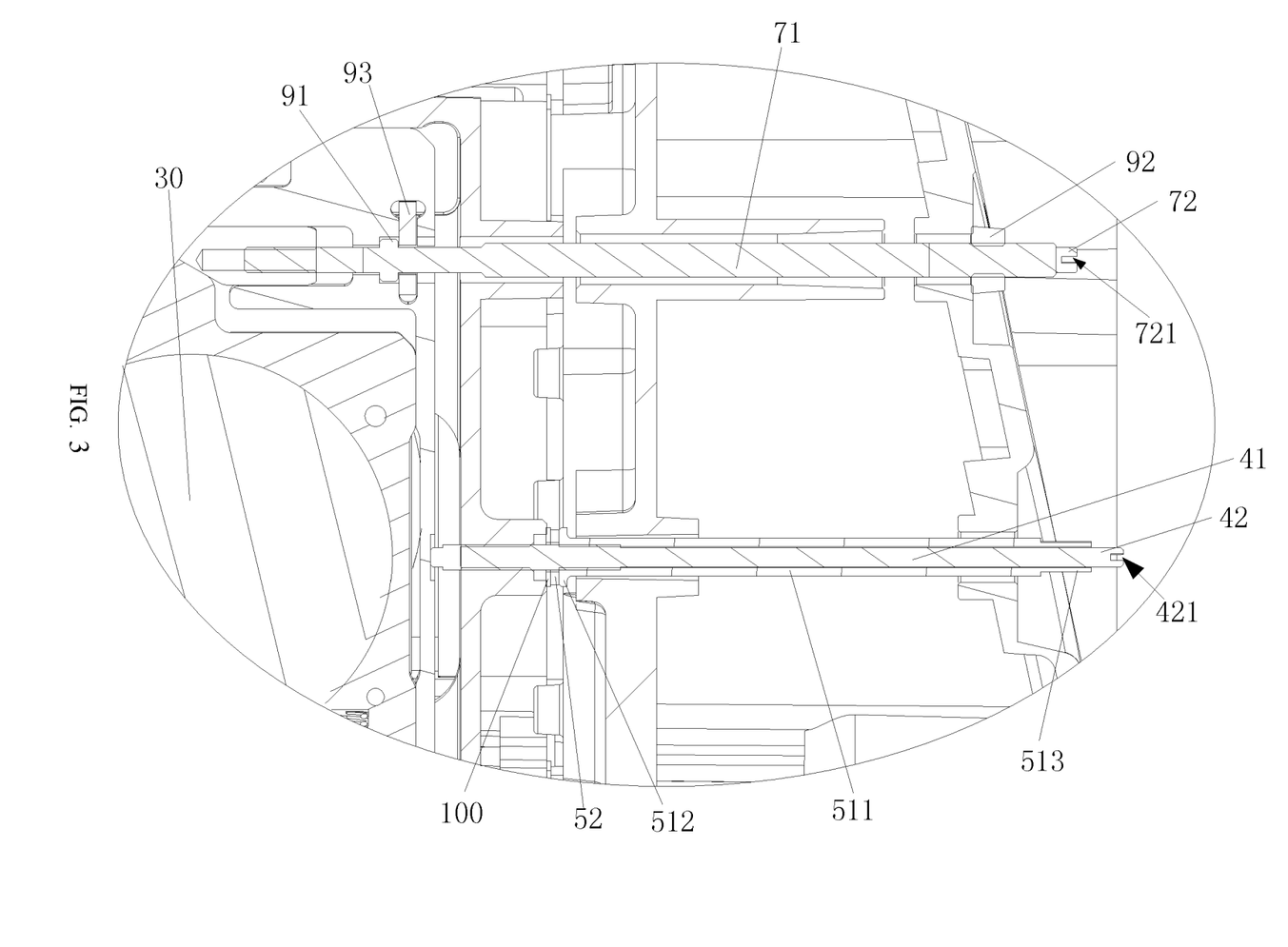
FIG. 3 is a partially enlarged schematic view of area A shown in FIG. 2.
Figure 4:
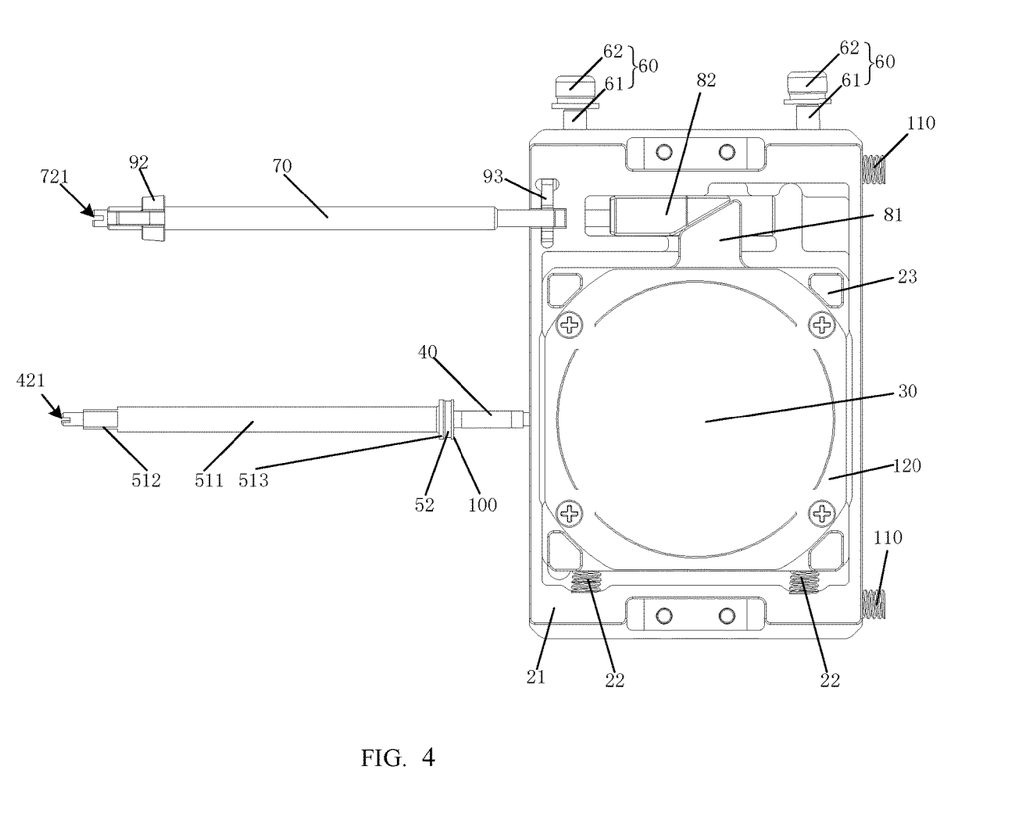
FIG. 4 is a schematic structural front view of an optical module with a frame being removed according to a form of the present disclosure.

FIG. 1 is a schematic structural perspective view of an optical module according to a form of the present disclosure, FIG. 2 is a schematic structural cross-sectional view of an optical module according to a form of the present disclosure, FIG. 3 is a partially enlarged schematic view of area A shown in FIG. 2, and FIG. 4 is a schematic structural front view of an optical module with a frame being removed according to a form of the present disclosure.

In a form, the optical module can include: a frame 10, a support assembly 20, an element 30 to be adjusted, a first adjusting screw rod 40, a first anti-loosening assembly 50, a sliding stopper 60, a second adjusting screw 70, a redirecting adjustment assembly 80, a second anti-loosening assembly 90, a color wheel (not shown in the figures), a flat washer 100, a first elastic member 110 and a fixture 120.

The first adjusting screw rod 40 is configured to adjust a position of s component in a first direction 'a', the second adjusting screw 70 is configured to adjust a position of a component in a second direction 'b'. The first anti-loosening assembly 50 is configured to lock the first adjusting screw rod 40 after position adjustment of the first adjusting screw rod 40, and the second anti-loosening assembly 90 is configured to lock the second adjusting screw 70 after position adjustment of the second adjusting screw 70.

The element 30 to be adjusted is arranged on the support assembly 20, and the support assembly 20 is movably supported within the frame 10. The first adjusting screw rod 40 is provided along the first direction a, and the first adjusting screw rod 40 is threaded to the frame 10 and is configured to abut against the support assembly 20 so as to adjust a position of the element 30 to be adjusted relative to the frame 10 in the first direction a. The first anti-loosening assembly 50 is configured to lock the first adjusting screw rod 40 and the frame 10 after position adjustment of the first adjusting screw rod 40.

In this form, the element 30 to be adjusted can be a lens 30. In other forms, the element 30 to be adjusted can also be another element, such as an optical element whose position needs to be adjusted to achieve different projection display effects. The following description takes the element 30 to be adjusted being the lens 30 as an example.

The frame 10 can include a first sub-frame 11, a second sub-frame 12, a first cover plate 13, a second cover plate 14, and a third cover plate 15. In an example, the first adjusting screw rod 40 is threaded to the first sub-frame 11, the support assembly 20 is movably supported within the first sub-frame 11, and the second sub-frame 12 is configured to support a color wheel. The first sub-frame 11 includes a first opening (not labeled). The first cover 13 is fixed to the first sub-frame 11 and covers the first opening to seal the first opening. A dustproof sealing ring (not shown in the figure) is provided between the first cover 13 and the first sub-frame 11. The second cover plate 14 is fixed to the second sub-frame 12. The first sub-frame 11 further includes a second opening (not labeled). During installation, the support assembly 20 and the lens 30 are assembled into the first sub-frame 11 through the second opening, and then the second opening is covered by the third cover plate 15. In other forms, the frame 10 may have other structures, which will not be limited by this form.

The support assembly 20 can include a first support member 21, a second elastic member 22, and a second support member 23. The first elastic member 110 is elastically supported between the support assembly 20 and the frame 10 so that the support assembly 20 is reversely biased when the first adjusting screw rod 40 abuts against the support assembly 20 along the first direction a relative to the frame 10. In an example, the first elastic member 110 is elastically supported between the first support member 21 and the first sub-frame 11. The second support member 23 is elastically supported within the first support member 21 along the second direction b through the second elastic member 22. The second elastic member 22 is supported between the first support member 21 and the second support member 23. The second direction b can be a direction perpendicular to the first direction a. The first direction a can be a horizontal direction, and the second direction b can be a vertical direction. The lens 30 is fixed to the second support member 23 by a fixture 120. In other forms, the support assembly 20 may have other structures, which will not be limited by this form.

There can be two first elastic members 110 provided, and positions of the two first elastic components 110 are axial symmetrical to each other about a diameter of the lens 30 in the first direction a. There can be two second elastic members 22 provided, and positions of the two second elastic components 22 are axial symmetrical to each other about a diameter of the lens 30 in the second direction b. In other forms, the number and position of first elastic member and the number and position of second elastic member can be other alternatives, which will not be limited by this form.

The first anti-loosening assembly 50 can include a first nut 51 and a first elastic washer 52. The first elastic washer 52 is sleeved on the first adjusting screw rod 40 and located between the first nut 51 and the frame 10. In an example, the first elastic washer 52 is located between the first nut 51 and the first sub-frame 11.

The first nut 51 includes a pipe body 511 threaded to the first adjusting screw rod 40, a first protrusion 512 connected to an end of the pipe body 511 close to the first elastic washer 52, and a first tool action portion 513 connected to an end of the pipe body 511 facing away from the first elastic washer 52. The first elastic washer 52 is arranged between the first protrusion 512 and the frame 10. In an example, the first elastic washer 52 is arranged between the first protrusion 512 and the first sub-frame 11. The pipe body 511, the first protrusion 512, and the first tool action portion 513 can be formed into one piece.

The first nut 51 can be a profiled nut, the first tool action portion 513 is a profiled tool action portion of the profiled nut, and a cross section of the profiled tool action portion can be a square, a hexagon, or the like.

The first adjusting screw rod 40 can include a first rod body 41 and a second tool action portion 42, and the second tool action portion 42 is connected to an end of the first rod body 41 facing away from the support assembly 20. An end surface of the second tool action portion 42 facing away from the first elastic washer 52 is provided with a first tool action slot 421. The first rod body 41 and the second tool action portion 42 can be formed into one piece.

The flat washer 100 is sleeved on the first adjusting screw rod 40 and is located between the first elastic washer 52 and the frame 10. In an example, the flat washer 100 is located between first elastic washer 52 and the first sub-frame 11.

An end of the sliding stopper 60 is fixed to the support assembly 20, and the frame 10 is provided with a strip-shaped hole (not shown) corresponding to the sliding stopper 60. The strip-shaped hole is provided along the first direction a. Another end of the sliding stopper 60 is slidably limited within the strip-shaped hole. There can be two sliding stoppers 60 provided, and positions of the two sliding stoppers 60 are axial symmetrical about the diameter of the lens 30 in the second direction b.

In this form, the sliding stopper 60 is a first screw 60. A screw rod 61 of the first screw 60 is connected to the support assembly 20 through a threaded connection or through a fastening connection. A screw head 62 of the first screw 60 is slidably limited within the strip-shaped hole.

In another form, the sliding stopper can further include a second screw, a second nut, and a second elastic washer. A screw rod of the second screw is threaded to the second nut through the strip-shaped hole. The second elastic washer is located between the frame and the nut, and the second nut is slidably limited within the strip-shaped hole.

By threading the first adjusting screw rod 40 to the first sub-frame 11, when the user uses a tool (such as a screwdriver) to act on the first tool action slot 421, the first adjusting screw rod 40 will rotate forward or backward to be screwed in or out relative to the first sub-frame 11. When being screwed in, the first adjusting screw rod 40 abuts against the support assembly 20 to move the support assembly 20 forward along the first direction a, so that the lens 30 moves forward. When the screw is screwed out, an elastic force of the first elastic member 110 causes the support assembly 20 to move backward along the direction a, so that the lens 30 moves backward. After adjustment of the first adjusting screw rod 40 is completed, the user can use a corresponding tool (such as a socket wrench) to act on the first tool action portion to rotate the first nut 51, so that the first nut 51 is tightly threaded to the first adjusting screw rod 40, thereby locking the first adjusting screw rod 40 to the first sub-frame 11. The first elastic washer 52 is arranged between the first protrusion 512 of the first nut 51 and the first sub-frame 11 to inhibit or prevent loosening of the threaded connection. Since the first adjusting screw rod 40 is threaded to the first nut 51 on the one hand, and threaded to the first sub-frame 11 on the other hand, if the first sub-frame 11 is also considered as a nut, then the first sub-frame 11, the first adjusting screw rod 40, and the first nut 51 will form a double-nut threaded connection structure, which can further inhibit or prevent loosening of the threaded connection. Further, by providing the sliding stopper 60, when the position of the lens 30 is adjusted in the first direction a, the support assembly 20 stably moves in the first direction a, thereby further increasing stability. Furthermore, by providing the flat washer 100, on the one hand, a contact area with the frame 10 can be increased, and on the other hand, damage to a surface of the frame 10 by the first spring washer 52 when the first nut 51 is removed can be eliminated.

The second adjusting screw 70 is threaded into the frame 10 and is threaded to a redirecting adjustment assembly 80. The second adjusting screw 70 is provided along the first direction a, and the position of the lens 30 relative to the frame 10 is adjusted by the redirecting adjustment assembly 80 along the second direction b during rotation. The second anti-loosening assembly 90 is configured to lock the second adjusting screw 70 to the frame 10 after position adjustment of the second adjusting screw 70.

In this form, by providing the redirecting adjustment assembly 80, the second adjusting screw 70 can be provided along the first direction a and adjust the position of the lens 30 along the second direction b, so that the first adjusting screw rod 40 and the second adjusting screw 70 are arranged along a same direction, i.e., the first direction a, and the directions of arrangement are the same, so that a tool action portion or the user operation portion (such as a disc-shaped nut described in the following) on the first adjusting screw rod 40 and the second adjusting screw 70 can be located at a same side of the optical module, which is convenient for the user to operate.

In other forms, the second adjusting screw can also be provided along the second direction b. The second adjusting screw adjusts the position of the lens 30 relative to the frame 10 along the second direction b during rotation, and the second anti-loosening assembly 90 is configured to lock the second adjusting screw to the frame 10 after position adjustment of the second adjusting screw. It is not difficult to understand that in this case, since the second adjusting screw is provided along the second direction b, the optical module may not include the redirecting adjustment assembly 80, in this case, the position of the lens 30 along the second direction b can also be adjusted by the second adjusting screw.

The second anti-loosening assembly 90 includes a second protrusion 91 arranged on the second adjusting screw 70, and a third nut 92 threaded to the second adjusting screw 70. The second protrusion 91 is fixedly limited within the support assembly 20 or the frame 10 along the first direction a. The second protrusion 91 and the second adjusting screw 70 can be formed into one piece.

The third nut 92 is a disc-shaped nut, a Spiralock nut, or an eccentric nut.

The second anti-loosening assembly 90 further includes a stop block 93 that is fixed to the support assembly 20, and the second protrusion 91 is limited between the stop block 93 and the support assembly 20.

The redirecting adjustment assembly 80 includes a first wedge-shaped portion 81 fixedly connected to the second support member 23, and a second wedge-shaped portion 82 threaded to the second adjusting screw 70 and movably disposed within the support assembly 20 along the first direction a. The first wedge-shaped portion 81 has a first wedge-shaped surface c, and the second wedge-shaped portion 82 has a second wedge-shaped surface d matching the first wedge-shaped surface c. The second adjusting screw 70 drives the second wedge-shaped portion d to move along the first direction a during rotation, and in turn drives the first wedge-shaped portion c to move along the second direction b, so that the second support member 23 drives the lens 30 along the second direction b relative to the first support member 21.

The second adjusting screw 70 includes a second rod body 71 and a third tool action portion 72 connected to an end of the second rod body 71 facing away from the support assembly 20. The second rod body 71 and the third tool action portion 72 can be formed into one piece.

An end surface of the third tool action portion 72 facing away from the support assembly 2A is provided with a second tool action slot 721.

Since the second adjusting screw 70 is threaded to the second wedge-shaped portion 82, and the second protrusion 91 makes the position of the second adjusting screw 70 unchangeable along the first direction a, when the user uses a tool to act on the second tool action slot 721 to rotate the first adjusting screw rod 70 forward or backward, the second wedge-shaped portion 82 will move forward or backward along the first direction a. When the second wedge-shaped portion 82 moves forward, the second wedge-shaped surface d contacts the first wedge-shaped surface c, so that the second wedge-shaped portion 82 drives the first wedge-shaped portion 81 to move forward along the second direction b, thereby driving the second support member 23 and the lens 30 fixed to the second support member 23 to move forward along the second direction b. When the second wedge-shaped portion 82 moves backward along the first direction a, since the second support member 23 is elastically supported within the first sub-support 21, the second support member 23 will move backward along the second direction b under an elastic force of the second elastic member 22. After the above-mentioned adjustment of the position of the lens 30 along the second direction b by the second adjusting screw 70 is completed, the third protrusion 92 and the third nut 92 are tightly clamped to the frame 10 by rotating the third nut 92, thereby achieving locking of the second adjusting screw 70 relative to the frame 10, and it will not be loosened even in harsh environments such as high and low temperature or high-intensity vibration.

The present disclosure provides an optical module, including: a first adjusting screw rod, a first anti-loosening assembly, a second adjusting screw and a second anti-loosening assembly. The first adjusting screw rod is configured to adjust a position of a component in a first direction, and the second adjusting screw is configured to adjust a position of a component in a second direction. The first anti-loosening assembly is configured to lock the first adjusting screw rod after position adjustment of the first adjusting screw rod, and the second anti-loosening assembly is configured to lock the second adjusting screw after position adjustment of the second adjusting screw. With the above-mentioned optical module, the present disclosure can provide beneficial effects of improving the stability of the position adjustment and ensuring the efficiency of the light source.

The above description merely illustrates implementation manners of the present disclosure and is not intended to limit the scope of the present disclosure. Any equivalent structure or equivalent process transformation made using the content of the present disclosure and the drawings, or directly or indirectly used in other related technical fields shall fall into the patent scope of the present disclosure.

What is claimed is:
1. An optical module, comprising:
a first adjusting screw rod configured to adjust a position of a component in a first direction;
a first anti-loosening assembly configured to lock the first adjusting screw rod after position adjustment of the first adjusting screw rod;

a second adjusting screw configured to adjust a position of a component in a second direction;
a second anti-loosening assembly configured to lock the second adjusting screw after position adjustment of the second adjusting screw;
a frame;
a support assembly; and
an element to be adjusted,
wherein the element to be adjusted is provided on the support assembly, the support assembly is movably supported within the frame, the first adjusting screw rod is provided along the first direction, and the first adjusting screw rod is threaded to the frame and is configured to abut against the support assembly so as to adjust a position of the element to be adjusted relative to the frame in the first direction, and the first anti-loosening assembly is configured to lock the first adjusting screw rod to the frame after the position adjustment of the first adjusting screw rod,
wherein the first anti-loosening assembly comprises a first nut, and a first elastic washer sleeved on the first adjusting screw rod and located between the first nut and the frame, and
wherein the first nut comprises:
a pipe body connected to the first adjusting screw rod;
a first protrusion connected to an end of the pipe body close to the first elastic washer; and
a first tool action portion connected to an end of the pipe body facing away from the first elastic washer,
wherein the first elastic washer is located between the first protrusion and the frame.

2. The optical module according to claim 1, wherein the first adjusting screw rod comprises a first rod body, and a second tool action portion connected to an end of the first rod body facing away from the support assembly.

3. The optical module according to claim 2, wherein the first nut is a profiled nut, the first tool action portion is a profiled tool action portion of the profiled nut, and an end surface of the second tool action portion facing away from the first elastic washer is provided with a first tool action slot.

4. The optical module according to claim 1, further comprising a flat washer sleeved on the first adjusting screw rod and located between the first elastic washer and the frame.

5. An optical module, comprising:
a first adjusting screw rod configured to adjust a position of a component in a first direction;
a first anti-loosening assembly configured to lock the first adjusting screw rod after position adjustment of the first adjusting screw rod;
a second adjusting screw configured to adjust a position of a component in a second direction;
a second anti-loosening assembly configured to lock the second adjusting screw after position adjustment of the second adjusting screw;
a frame;
a support assembly; and
an element to be adjusted,
wherein the element to be adjusted is provided on the support assembly, the support assembly is movably supported within the frame, the first adjusting screw rod is provided along the first direction, and the first adjusting screw rod is threaded to the frame and is configured to abut against the support assembly so as to adjust a position of the element to be adjusted relative to the frame in the first direction, and the first anti-loosening assembly is configured to lock the first adjusting screw rod to the frame after the position adjustment of the first adjusting screw rod, and
wherein the optical module further comprises:
a first elastic member, wherein the first elastic member is elastically supported between the support assembly and the frame in such a manner that the support assembly is reversely biased when the first adjusting screw rod abuts against the support assembly along the first direction relative to the frame.

6. The optical module according to claim 5, further comprising a sliding stopper, wherein the frame is provided with a strip-shaped hole corresponding to the sliding stopper, the strip-shaped hole is provided along the first direction, one end of the sliding stopper is fixed to the support assembly, and the other end of the sliding stopper is disposed within the strip-shaped hole.

7. The optical module according to claim 6, wherein the sliding stopper is a first screw, a screw rod of the first screw is connected to the support assembly through a threaded connection or through a fastening connection, and a screw head of the first screw is slidably limited within the strip-shaped hole.

8. The optical module according to claim 6, wherein the sliding stopper comprises a second screw, a second nut, and a second elastic washer, a screw rod of the second screw is threaded to the second nut through the strip-shaped hole, the second elastic washer is disposed between the frame and the second nut, and the second nut is slidably limited within the strip-shaped hole.

9. The optical module according to claim 5, further comprising a redirecting adjustment assembly, wherein the second adjusting screw is threaded into the frame and is threaded to the redirecting adjustment assembly, the second adjusting screw is provided along the first direction and configured to adjust, during rotation, a position of the element to be adjusted relative to the frame in the second direction through the redirecting adjustment assembly, and the second anti-loosening assembly is configured to lock the second adjusting screw to the frame after the position adjustment of the second adjusting screw.

10. The optical module according to claim 5, wherein the second adjusting screw is provided along the second direction and configured to adjust, during rotation, a position of the element to be adjusted relative to the frame in the second direction, and the second anti-loosening assembly is configured to lock the second adjusting screw to the frame after the position adjustment of the second adjusting screw.

11. An optical module, comprising:
a first adjusting screw rod configured to adjust a position of a component in a first direction;
a first anti-loosening assembly configured to lock the first adjusting screw rod after position adjustment of the first adjusting screw rod;
a second adjusting screw configured to adjust a position of a component in a second direction;
a second anti-loosening assembly configured to lock the second adjusting screw after position adjustment of the second adjusting screw;
a frame;
a support assembly; and
an element to be adjusted,
wherein the element to be adjusted is provided on the support assembly, the support assembly is movably supported within the frame, the first adjusting screw rod is provided along the first direction, and the first adjusting screw rod is threaded to the frame and is configured to abut against the support assembly so as to adjust a position of the element to be adjusted relative to the frame in the first direction, and the first anti-loosening assembly is configured to lock the first adjusting screw rod to the frame after the position adjustment of the first adjusting screw rod, wherein the optical module further comprises a redirecting adjustment assembly, wherein the second adjusting screw is threaded into the frame and is threaded to the redirecting adjustment assembly, the second adjusting screw is provided along the first direction and configured to adjust, during rotation, a position of the element to be adjusted relative to the frame in the second direction through the redirecting adjustment assembly, and the second anti-loosening assembly is configured to lock the second adjusting screw to the frame after the position adjustment of the second adjusting screw, and wherein the second anti-loosening assembly comprises a second protrusion provided on the second adjusting screw and a third nut threaded to the second adjusting screw, and the second protrusion is fixedly limited within the support assembly or the frame along the first direction.

12. The optical module according to claim 11, wherein the third nut is a disc-shaped nut, a spiralock nut, or an eccentric nut.

13. The optical module according to claim 11, wherein the second anti-loosening assembly further comprises a stop block, the stop block is fixed to the support assembly, and the second protrusion is limited between the stop block and the support assembly.

14. An optical module, comprising:
a first adjusting screw rod configured to adjust a position of a component in a first direction;
a first anti-loosening assembly configured to lock the first adjusting screw rod after position adjustment of the first adjusting screw rod;
a second adjusting screw configured to adjust a position of a component in a second direction;
a second anti-loosening assembly configured to lock the second adjusting screw after position adjustment of the second adjusting screw;
a frame;
a support assembly; and
an element to be adjusted,
wherein the element to be adjusted is provided on the support assembly, the support assembly is movably supported within the frame, the first adjusting screw rod is provided along the first direction, and the first adjusting screw rod is threaded to the frame and is configured to abut against the support assembly so as to adjust a position of the element to be adjusted relative to the frame in the first direction, and the first anti-loosening assembly is configured to lock the first adjusting screw rod to the frame after the position adjustment of the first adjusting screw rod,
wherein the optical module further comprises a redirecting adjustment assembly, wherein the second adjusting screw is threaded into the frame and is threaded to the redirecting adjustment assembly, the second adjusting screw is provided along the first direction and configured to adjust, during rotation, a position of the element to be adjusted relative to the frame in the second direction through the redirecting adjustment assembly, and the second anti-loosening assembly is configured to lock the second adjusting screw to the frame after the position adjustment of the second adjusting screw, and
wherein the support assembly comprises a first support member, a second elastic member, and a second support member; the second support member is elastically supported within the first support member along the second direction through the second elastic member; the redirecting adjustment assembly comprises a first wedge-shaped portion fixedly connected to the second support member, and a second wedging-shaped portion threaded to the second adjusting screw and movably disposed within the support assembly along the first direction; the first wedge-shaped portion comprises a first wedge-shaped surface, and the second wedge-shaped portion comprises a second wedge-shaped surface matching the first wedge-shaped surface; the second adjusting screw is configured to drive, during rotation, the second wedge-shaped portion to move along the first direction, and in turn drive the first wedge-shaped portion to move along the second direction, so that the second support member drives the element to be adjusted to move relative to the first support member in the second direction.

15. The optical module according to claim 14, wherein the second adjusting screw comprises a second rod body and a third tool action portion connected to an end of the second rod body facing away from the support assembly, and an end surface of the third tool action portion facing away from the support assembly is provided with a second tool action slot.

16. An optical module, comprising:
a first adjusting screw rod configured to adjust a position of a component in a first direction;
a first anti-loosening assembly configured to lock the first adjusting screw rod after position adjustment of the first adjusting screw rod;
a second adjusting screw configured to adjust a position of a component in a second direction;
a second anti-loosening assembly configured to lock the second adjusting screw after position adjustment of the second adjusting screw;
a frame;
a support assembly; and
an element to be adjusted,
wherein the element to be adjusted is provided on the support assembly, the support assembly is movably supported within the frame, the first adjusting screw rod is provided along the first direction, and the first adjusting screw rod is threaded to the frame and is configured to abut against the support assembly so as to adjust a position of the element to be adjusted relative to the frame in the first direction, and the first anti-loosening assembly is configured to lock the first adjusting screw rod to the frame after the position adjustment of the first adjusting screw rod, and
wherein the element to be adjusted is a lens, the optical module further comprises a color wheel, the frame comprises at least a first sub-frame and a second sub-frame fixedly connected to the first sub-frame, the support assembly is movably supported within the first sub-frame, and the color wheel is supported within the second sub-frame.

* * * * *